(12) United States Patent
Garcia Nieto et al.

(10) Patent No.: US 10,538,308 B2
(45) Date of Patent: Jan. 21, 2020

(54) AIRCRAFT EMPENNAGE

(71) Applicant: AIRBUS OPERATIONS SL, Madrid (ES)

(72) Inventors: Carlos Garcia Nieto, Madrid (ES); Fernando Pereira Mosqueira, Madrid (ES); Iker Velez De Mendizabal Alonso, Madrid (ES); Enrique Guinaldo Fernandez, Madrid (ES); Francisco Javier Honorato Ruiz, Madrid (ES)

(73) Assignee: AIRBUS OPERATIONS S.L., Madrid (ES)

( * ) Notice: Subject to any disclaimer, the term of this patent is extended or adjusted under 35 U.S.C. 154(b) by 349 days.

(21) Appl. No.: 15/588,332

(22) Filed: May 5, 2017

(65) Prior Publication Data

US 2017/0320561 A1    Nov. 9, 2017

(30) Foreign Application Priority Data

May 6, 2016    (EP) .................................... 16382198

(51) Int. Cl.
*B64C 9/00* (2006.01)
*B64C 5/02* (2006.01)
*B64C 9/02* (2006.01)

(52) U.S. Cl.
CPC .................. *B64C 9/00* (2013.01); *B64C 5/02* (2013.01); *B64C 9/02* (2013.01)

(58) Field of Classification Search
CPC .... B64C 9/00; B64C 9/02; B64C 5/02; B64C 5/10; B64C 9/20; B64C 9/12
USPC ...................................................... 244/75.1
See application file for complete search history.

(56) References Cited

U.S. PATENT DOCUMENTS

| | | | | |
|---|---|---|---|---|
| 2,127,864 A | * | 8/1938 | Girard ....................... | B64C 3/54 244/215 |
| 5,538,202 A | * | 7/1996 | Thornburg .............. | B64C 13/36 244/215 |
| 8,191,820 B1 | * | 6/2012 | Westra ...................... | B64C 9/12 244/207 |
| 2004/0245387 A1 | | 12/2004 | Kreeke et al. | |
| | | (Continued) | | |

FOREIGN PATENT DOCUMENTS

EP    2886450    6/2015

OTHER PUBLICATIONS

European Search Report cited in 16382198.6 dated May 19, 2017, five pages.

*Primary Examiner* — Nicholas McFall
*Assistant Examiner* — Terri L Filosi
(74) *Attorney, Agent, or Firm* — Nixon & Vanderhye P.C.

(57) ABSTRACT

An aircraft aerodynamic surface (1) including a torsion box (2) having a front spar (21) and rear spar (22), a first control surface (3) including a front spar (31) and a trailing edge (32) and a second control surface (4) having a front spar (41), a trailing edge (42), and a pivot device (5, 6, 7, 8) for pivotally attaching the first control surface (3) and the second control surface (4) to the rear spar (22) of the torsion box (2), the first control surface is an inboard control surface (4) including two lateral ribs (9, 9'), six inner ribs (11, 12, 13, 14, 15, 10) and an inner spar (16), and the second control surface (3) is an outboard control surface which includes two lateral ribs (20, 20'), three internal ribs (17, 18, 19), two internal spars (24, 24') and one internal spar (23).

12 Claims, 5 Drawing Sheets

(56) References Cited

U.S. PATENT DOCUMENTS

| | | | |
|---|---|---|---|
| 2006/0169848 A1* | 8/2006 | Libby | B64C 3/50 |
| | | | 244/216 |
| 2012/0153085 A1* | 6/2012 | Good | B64C 9/20 |
| | | | 244/215 |
| 2015/0197328 A1* | 7/2015 | Pereira Mosqueira | B64C 5/02 |
| | | | 244/87 |
| 2018/0170521 A1* | 6/2018 | Murayama | B64C 3/10 |
| 2018/0178902 A1* | 6/2018 | Nfonguem | B64C 13/42 |

* cited by examiner

AIRCRAFT EMPENNAGE

RELATED APPLICATION

This application claims the benefit of European Patent Application EP 16382198.6, filed May 6, 2016, the entirety of which is incorporated by reference.

FIELD OF THE INVENTION

The present invention refers to large aircraft aerodynamic surfaces, such as large aircraft empennages on Horizontal tail planes and Vertical tail planes. These large aircraft aerodynamic surfaces have inboard and outboard control surfaces.

The invention may be embodied as optimized inboard and outboard control surfaces design for large aircraft empennages. Similarly, the invention may be applied to control surfaces such as elevators and rudders.

BACKGROUND OF THE INVENTION

Aircraft aerodynamic empennages with divided control surfaces (inboard and outboard) for Horizontal tail plane (HTP) elevator or Vertical tail plane (VTP) rudder are very well known in the prior art. Weight and cost saving is one of the most important issues in aircrafts design so there is a continuous optimization need.

Elevators are control surfaces placed on both sides of the Horizontal Tail Plane (HTP) of an aircraft, and they are used to control the pitch of the aircraft. Similarly to the case of the torsion box, elevators are mainly multi-rib structures made of composite materials, formed by at least a main spar, and a plurality of ribs supporting upper and lower panels.

Elevators are usually constructed as one assembly. Although in very large commercial aircraft, they are split in two different sub-assemblies, inboard and outboard elevators. Similarly, in the case of rudders for large aircraft, the same concept is applied to the rudder design, with upper and lower rudders.

Another known structure for control surfaces, especially for flaps or low size control surfaces such as ailerons, is the composite multi-spar architecture, which can be an option over traditional multi-rib structures, with the aim of both weight and cost reduction. A multi-spar structure is formed only by spars and cover panels, so that the ribs are replaced by a number of spars longitudinally arranged.

FIG. 2 shows a prior art typical architecture for large aircraft aerodynamic surface (1) comprising a torsion box (2) having a front spar (21) and rear spar (22), a first control surface (3) comprising a front spar (31) and a trailing edge (32) and a second control surface (4) comprising a front spar (41) and a trailing edge (42), and hinge fittings (6,8) and actuators fittings (5, 7) as means for pivotally attaching the first control surface (3) and the second control surface (4) to the rear spar (22) of the torsion box (2). The first control surface (3) shown in FIG. 2 is the outboard elevator which comprises fifteen ribs (33) and one spar (31) and the second control surface (4) is the inboard elevator which comprises nine ribs (43) an one spar (41).

Different rib configuration for control surfaces are known. However in the case of aircraft aerodynamic surfaces comprising inboard and outboard control surfaces (typically found in large aircrafts), best compromise between manufacturing simplification and weight reduction is to be found.

SUMMARY OF THE INVENTION

Taking into account the weight and cost reduction targeted mentioned above, it has been designed a new inboard control surface and outboard control surface for aerodynamic surfaces as described below.

An aircraft aerodynamic surface is described below comprising a torsion box having a front spar and rear spar, a first control surface comprising a front spar and a trailing edge and a second control surface comprising a front spar and a trailing edge, and means for pivotally attaching the first control surface and the second control surface to the rear spar of the torsion box wherein such means are hinge fittings and actuator fittings attached to the front spar of either the first control surface and the second control surface.

The means for pivotally attaching the first control surface and the second control surface to the rear spar of the torsion box comprise for each control surface: (i) at least one hinge fitting joined to the front spar of the first control surface and to the front spar of the second control surface for pivotally mounting the first and second control surfaces to the rear spar of the torsion box, and (ii) at least two actuator fittings joined to the front spar of the first control surface and to the front spar of the second control surface for joining an actuator to the first control surface and to the second control surface respectively.

The optimized first control surface is an inboard control surface which comprises two lateral ribs, six inner ribs between them and one inner spar.

The two lateral ribs of the first control surface, first lateral rib and second lateral rib, are attached each one either to the trailing edge and to the front spar arranged to define the first lateral rib an angle $\alpha L1$ with the front spar preferably between 65° to 85° and the second lateral rib an angle $\alpha L2$ with the front spar between 55° to 75°.

The six internal ribs of the first control surface are located between the two lateral ribs wherein one inner rib is a central rib extended from the trailing edge to the front spar arranged to define an angle $\alpha C1$ with the spar in the range between 75° to 95°, two inner ribs, first and second inner ribs, are located between the first lateral rib and the central rib and inclined an angle $\alpha 1$, $\alpha 2$ towards the first lateral rib in the preferred range between 95° to 115° and three inner ribs, third, fourth and fifth inner ribs, are located between the second lateral rib and the central rib and inclined an angle $\alpha 3$, $\alpha 4$, $\alpha 5$ towards the second lateral rib, respectively.

The second rib and the third rib are ribs adjacent to the central rib and attached to the front spar of the inboard control surface in the position where a first and second actuator fitting, respectively, are attached to the front spar of the inboard control surface.

Additionally an inner spar, parallel to the front spar and to the trailing edge, is attached to the central rib and extended from the second inner rib inclined towards the first lateral rib to the third inner rib inclined towards the second lateral rib.

The preferred range angles $\alpha 5$, $\alpha 6$, $\alpha 7$ of the third, fourth and fifth inner ribs towards the second lateral rib are 75° to 90°, 40° to 60° and 50° to 70° respectively.

On the other hand, the optimized second control surface of the aircraft aerodynamic surface of the invention is an outboard control surface which comprises two lateral ribs, three inner ribs and three inner spars.

The two lateral ribs of the outboard control surface, first lateral rib and second lateral rib, are attached each one either to the trailing edge and to the front spar of the outboard control surface and are arranged to define each lateral rib an angle, $\beta L1$, $\beta L2$, with the front spar between 55° to 75°.

The three inner ribs of the outboard control surface are located between the two lateral ribs wherein a first rib is a central rib extended from the trailing edge to the front spar arranged to define an angle βC1 with the spar in the range between 80° to 100°, a second rib is located between the first lateral rib and the central rib, inclined towards the first lateral rib to define an angle β2 and attached to the front spar of the outboard control surface in the position where a first actuator fitting is attached to the front spar and the third rib is located between the second lateral rib and the central rib, inclined towards the second lateral rib to define an angle β3 and attached to the front spar of the outboard control surface in a position where a first actuator fitting is attached to the front spar.

Additionally two internal spars parallel to the front spar and the trailing edge are extended from the first lateral rib to the second lateral rib, and one internal spar parallel to the front spar and the trailing edge is extended from the second rib to the third rib.

Both the inboard and outboard control surfaces, typically used for elevators or rudders, were designed challenging weight and cost efficiency while reducing the number of elementary parts. Load path conceptual studies were performed to optimize internal members arrangement.

This new inboard and outboard control surfaces design comprises conventional skins stiffened with stringers joined to a minimum number of internal parts (ribs and spars) with an innovative arrangement not considered up to date.

Table 1 for inboard elevator and Table 2 for outboard elevator show the global comparisons within the prior art architecture and the invention architecture:

TABLE 1

| Inboard Elevator | | |
| --- | --- | --- |
| Configuration name | Scheme | Structural components |
| Prior art Inboard elevator | Prior art FIG. 2 | 9 ribs 1 spar |
| Optimized Inboard elevator | FIG. 4 | 8 ribs 2 spars |

TABLE 2

| Outboard Elevator | | |
| --- | --- | --- |
| Configuration name | Scheme | Structural components |
| Prior art outboard elevator | Prior art FIG. 2 | 15 ribs 1 spar |
| Optimized outboard elevator | FIG. 5 | 5 ribs 4 spars |

Additionally, the aspect ratio (AR) for each inboard and outboard control surface is the maximum span to the maximum chord:

$AR_{Inboard} = $ Maximum $Span_{inboard}/$Maximum $Chord_{inboard}$ $AR_{outboard} = $ Maximum $Span_{outboard}/$Maximum $Chord_{outboard}$ Wherein the ranges of the aspect ratio of the inboard control surface is between 1.5 to 2.5 and the aspect ratio of the outboard control surface is between the range of 4.5 to 5.5. The maximum Span of the inboard and outboard control surface is the distance between lateral ribs of each control surface. The maximum Chord of the inboard and outboard control surface is the distance from the trailing edge to the front spar of each control surface.

BRIEF DESCRIPTION OF THE DRAWINGS

Embodiments of the invention are henceforth described with reference to the accompanying drawings, wherein.

DETAILED DESCRIPTION

Figure 1:
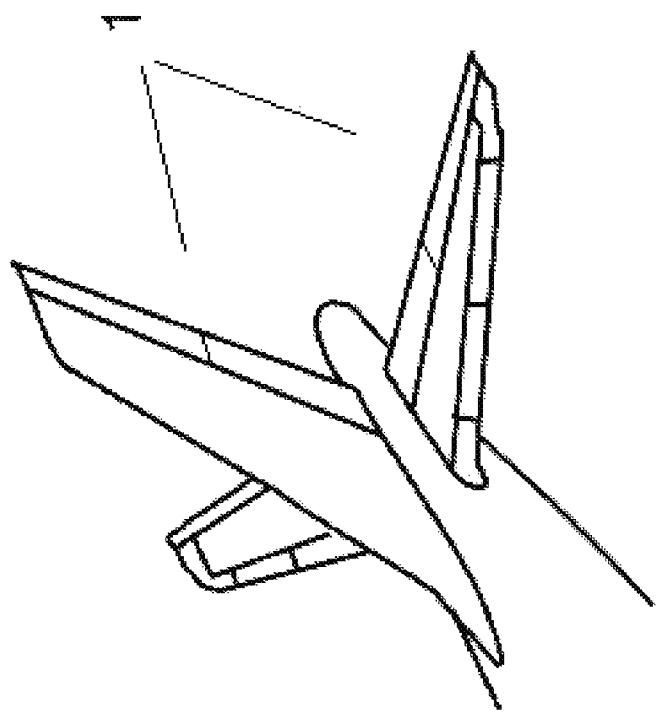
FIG. 1 shows a section of the fuselage of an aircraft showing the control surfaces of the Horizontal tail plane and Vertical tail plane of the prior art comprising inboard and outboard control surfaces.
Figure 2:
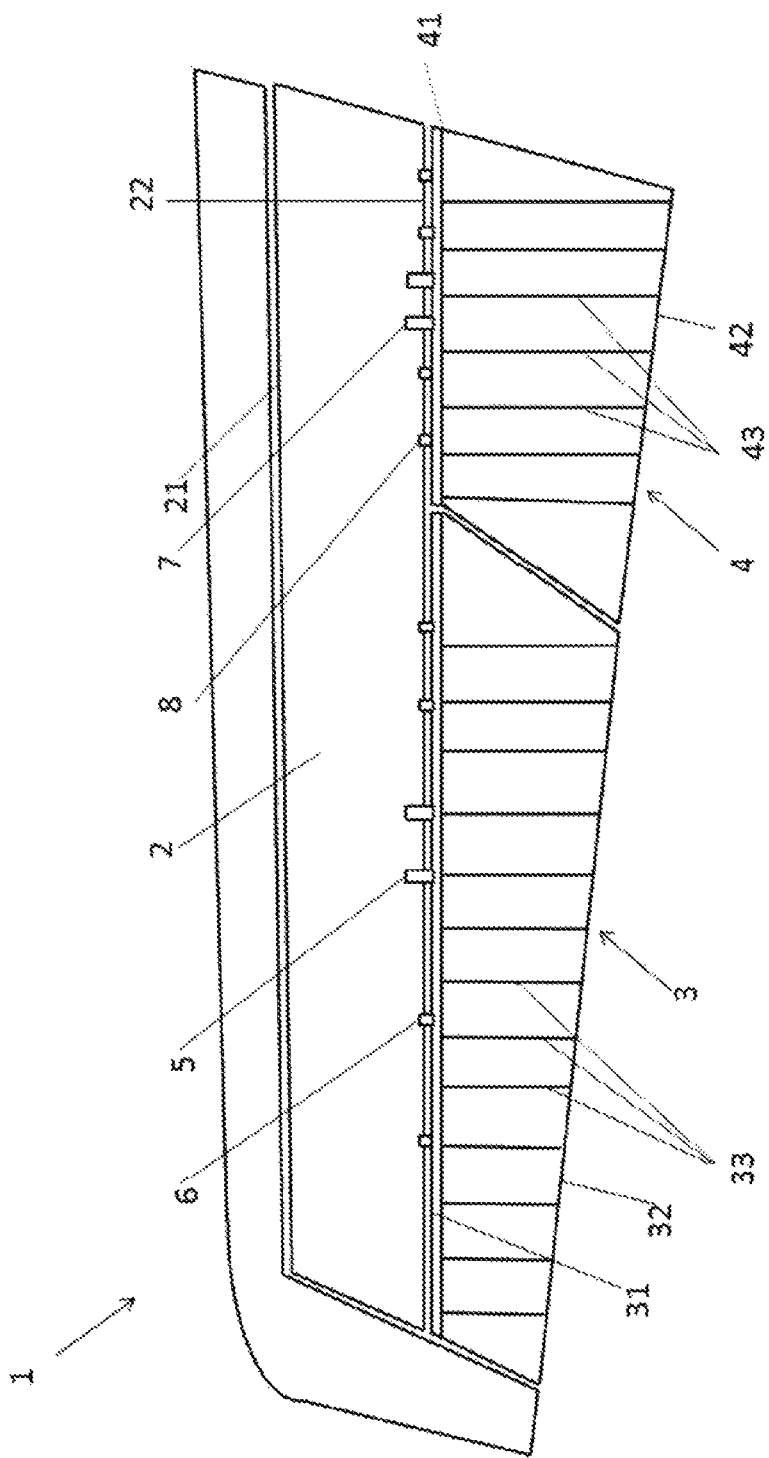
FIG. 2 shows a schematic representation of an aircraft aerodynamic surface comprising an inboard control surface and an outboard control surface of the prior art.
Figure 3:
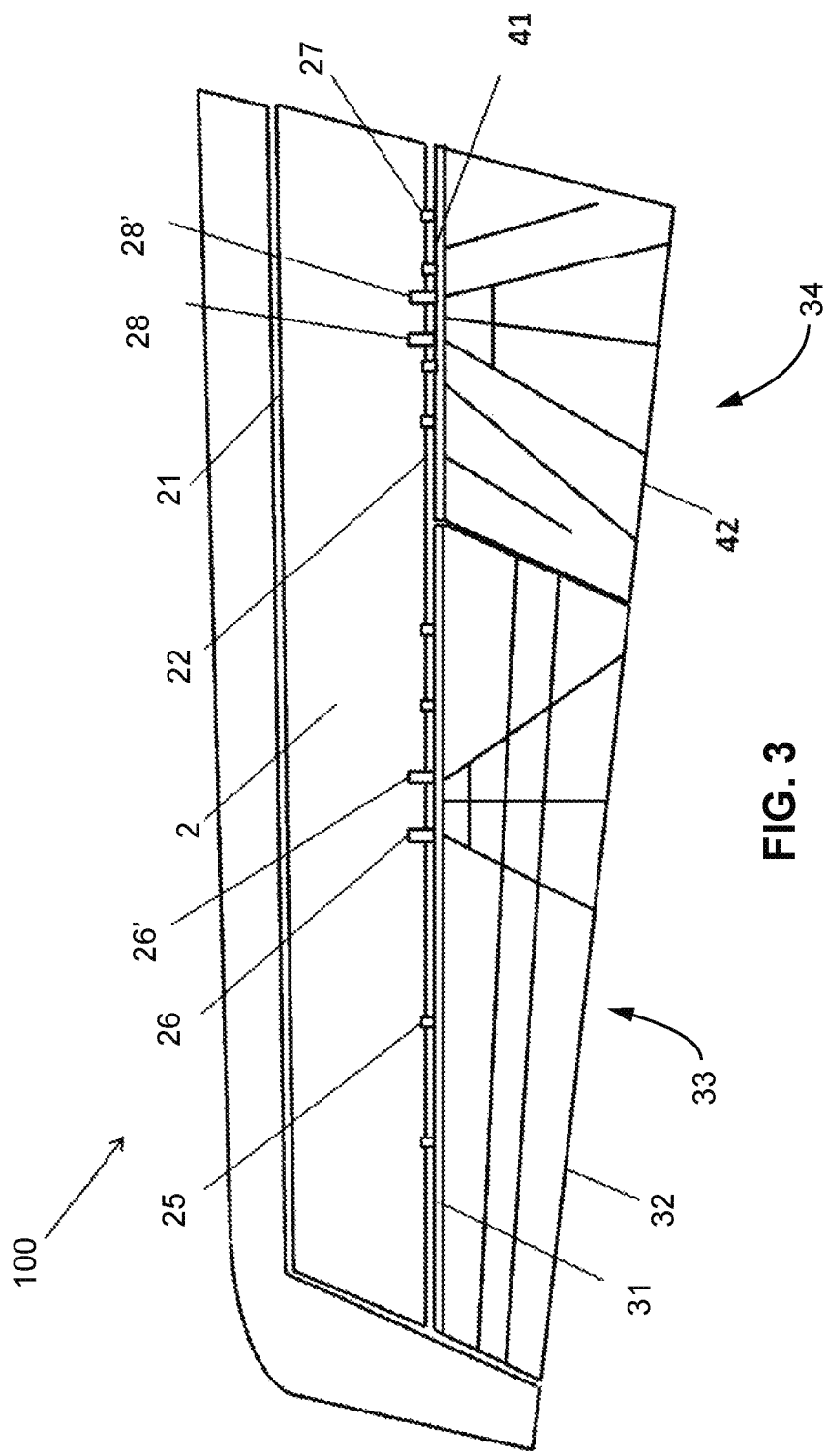
FIG. 3 shows a schematic representation of the inboard elevator and an outboard elevator according to the invention
Figure 4:
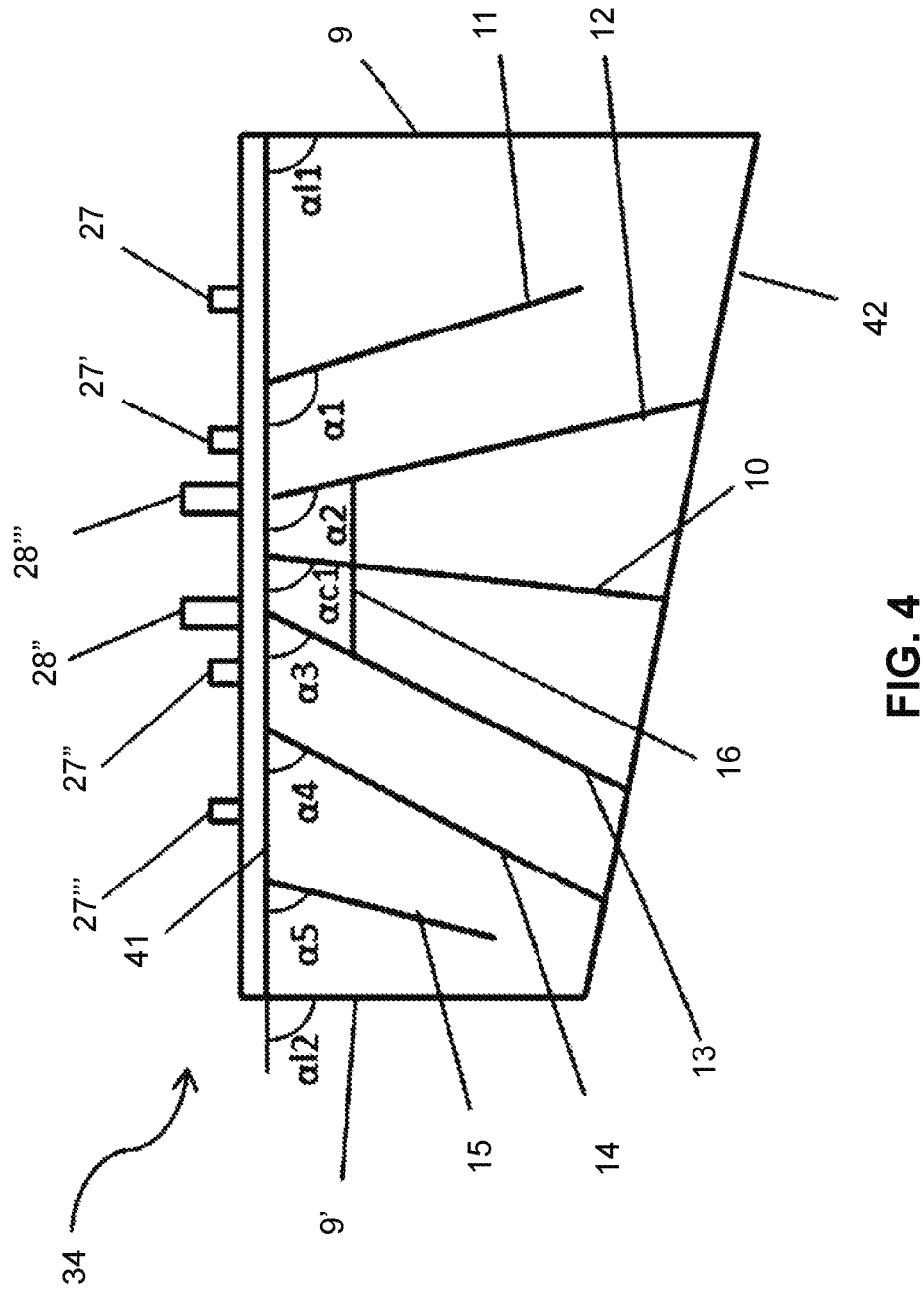
FIG. 4 shows a detailed schematic representation of the inboard control surface of FIG. 3.
Figure 5:
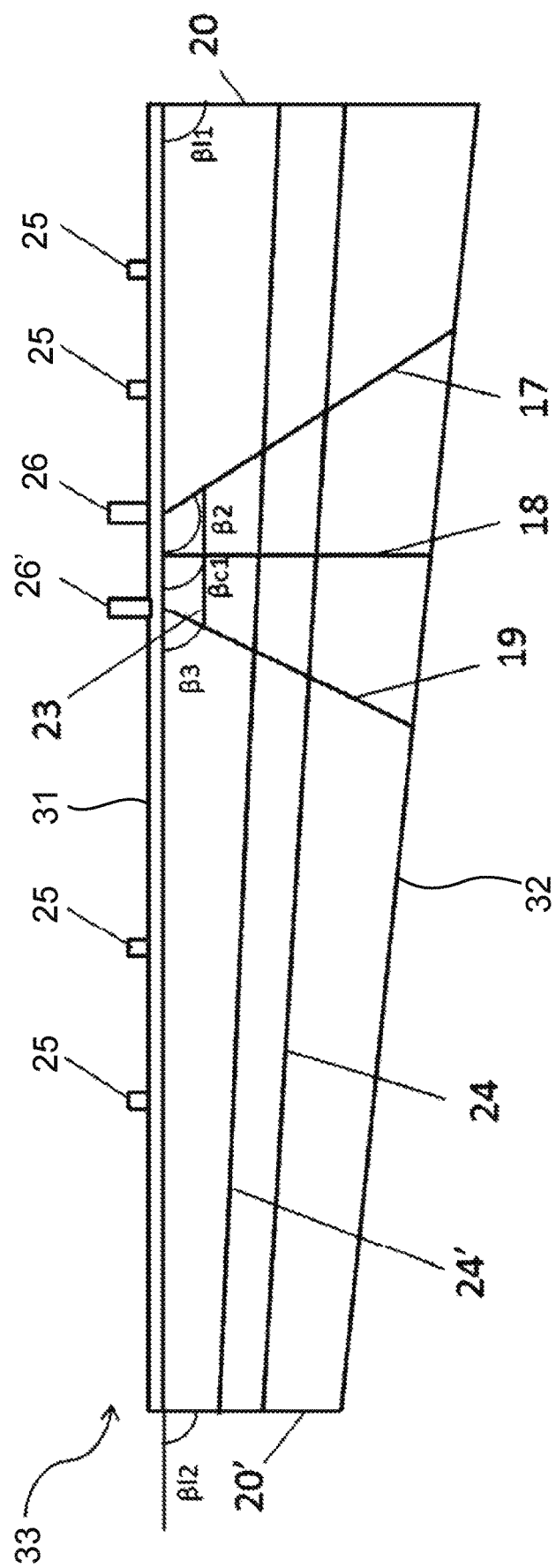
FIG. 5 shows a detailed schematic representation of the outboard control surface of FIG. 3.

The inboard and outboard control surfaces architecture of the invention is shown in FIGS. 3, 4 and 5 where an elevator is shown comprising an inboard elevator (34) and an outboard elevator (33).

FIG. 3 shows an aircraft aerodynamic surface (100) comprising a torsion box (2) having a front spar (21) and rear spar (22), an outboard elevator (33) comprising a front spar (31) and a trailing edge (32) and an inboard elevator (4) comprising a front spar (41), a trailing edge (42).

As shown in FIG. 3, hinge fittings (25, 27) are used for pivotally attaching the outer elevator (33) and the inner elevator (34) to the rear spar (22) of the torsion box (2), and actuator fittings (26, 26', 28, 28') are used for joining actuators to the inboard elevator (34) or the outboard elevator (33).

As shown in FIG. 4, the inboard elevator (34) comprises two lateral ribs (9, 9'), which are first lateral rib (9) and second lateral rib (9') attached each one either to the trailing edge (42) and to the front spar (41) arranged to define the first lateral rib (9) an angle αL1 of 75° with the front spar (41) and the outboard lateral rib (9') an angle αL2 of 65° with the spar (41).

The inboard elevator (34) also comprises six internal ribs (11, 12, 13, 14, 15) located between the two lateral ribs (9, 9') wherein: (i) one inner rib is a central rib (10) extended from the trailing edge (42) to the front spar (41) arranged to define an angle αC1 of 83° with the spar (41), (ii) two inner ribs (11, 12), first and second inner ribs, are located between the first lateral rib (9) and the central rib (10) and inclined towards the first lateral rib (9) to define an angle α1, α2 of 105° with the spar (41) and wherein the second internal rib (12) is located adjacent to the central rib (10) and attached to the spar (41) in the position where a third actuator fitting (8) is attached to the spar (41), and three inner ribs (13, 14, 15), third, fourth and fifth inner ribs, are located between the central rib (10) and the second lateral rib (9') and inclined towards the second lateral rib (9') to define an angle α3, α4, α5 of 60°, 50°, 58° respectively, and wherein the third internal rib (13) is located adjacent to the central rib (10) and attached to the spar (41) in the position where a fourth actuator fitting (8') is attached to the spar (41).

Additionally the inboard elevator (34) comprises an internal spar (16) parallel to the front spar (41) and the trailing edge (42) attached to the central rib (10) and extended from the second internal rib (12) inclined towards the first lateral rib (9) to the third internal rib (13) inclined towards the second lateral rib (9').

In an embodiment the second inner rib (12), third inner rib (13) and fourth rib (14) of the inboard control surface (4) are attached to both the front spar (41) and to the trailing edge (42) and the first inner rib (11) and fifth inner rib (15) only to the front spar (41).

As shown in FIG. 5, the outboard elevator (3) comprises two lateral ribs (20, 20'), first outboard lateral rib (20) and second outboard lateral rib (20'), attached each one either to the trailing edge (32) and to the front spar (31) arranged to define each lateral rib (20, 20') an angle βL1, βL2 of 65° with the front spar (31).

The outboard elevator also comprises three internal ribs (17, 18, 19) located between the two lateral ribs (20, 20') wherein:

a first inner rib is a central rib (18) extended from the trailing edge (32) to the front spar (31) arranged to define an angle βC1 of 90° with the spar (31), a second inner rib (17) is located between the first lateral rib (20) and the central rib (18), inclined towards the first lateral rib (20) to define an angle β2 of 125° with the spar (31) and attached to the front spar (31) of the outboard control surface (33) where a first actuator fitting (26) is attached to the spar (31), a third inner rib (19) is located between the second lateral rib (20') and the central rib (18), inclined towards the second lateral rib (20') to define an angle β3 of 62° with the spar (31) and attached to the front spar (31) of the outboard control surface (33) in the position where a second actuator fitting (26') is attached to the spar.

Additionally the outboard elevator (33) comprises two internal spars (24, 24') parallel to the front spar (31) and the trailing edge (32) extended from the first lateral rib (20) to the second lateral rib (20'), and one internal spar (23) parallel to the front spar (31) and the trailing edge (32) extended from the second rib (17) to the third rib (19).

All the angles α and β mentioned in present description and embodiments are considered in the anti-clockwise direction from the front spar axis as shown in the drawings.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An aircraft aerodynamic surface comprising a torsion box having a front spar and rear spar, a first control surface comprising a front spar and a trailing edge and a second control surface comprising a front spar, a trailing edge, and means for pivotally attaching the first control surface and the second control surface to the rear spar of the torsion box,
   wherein the first control surface is an inboard control surface which comprises:
      a first lateral rib and a second lateral rib attached each one either to the trailing edge and to the front spar arranged,
      six inner ribs located between the two lateral ribs wherein one inner rib of the six inner ribs is a central rib extended from the trailing edge to the front spar arranged so as to define an angle α4 with the spar in the range between 75° to 95°,
      a first inner rib and a second inner rib of the six inner ribs are located between the first lateral rib and the central rib and inclined an angle α2, α3 towards the first lateral rib, and
      a third inner rib, a fourth inner rib and a fifth inner rib of the six inner ribs are located between the second lateral rib and the central rib and inclined an angle α5, α6, α7 towards the second lateral rib, and
      an inner spar parallel to the front spar and to the trailing edge, attached to the central rib and extended from the second inner rib inclined towards the first lateral rib to the third inner rib inclined towards the second lateral rib, and
   the second control surface is an outboard control surface which comprises:
      a first outboard lateral rib and a second outboard lateral rib, attached each one either to the trailing edge and to the front spar of the outboard control surface and arranged to define each lateral rib an angle, β1, β5,
      three internal ribs located between the two lateral ribs wherein one of the three internal ribs is a central rib extended from the trailing edge to the front spar arranged to define an angle β3 with the spar in the range between 80° to 100°,
      a second rib of the three internal ribs is located between the first lateral rib and the central rib and inclined towards the first lateral rib,
      a third rib of the three internal ribs is located between the second lateral rib and the central rib, inclined towards the second lateral rib,
      two internal spars parallel to the front spar and the trailing edge extended from the first lateral rib to the second lateral rib, and
      one internal spar parallel to the front spar and the trailing edge extended from the second rib to the third rib.

2. The aircraft aerodynamic surface according to claim 1 the pivot device configured to attach the first control surface and the second control surface to the rear spar of the torsion box comprise for each control surface:
   at least one hinge fitting joined to the front spar of the first control surface and to the front spar of the second control surface for pivotally mounting the first and second control surfaces to the rear spar of the torsion box, and
   at least two actuator fittings joined to the front spar of the first control surface and to the front spar of the second control surface for joining an actuator to the first control surface and to the second control surface respectively.

3. The aircraft aerodynamic surface according to claim 2 wherein the second rib and the third rib of the inboard control surface are ribs adjacent to the central rib and are attached to the front spar of the inboard control surface in a position where a first and second actuator fittings, respectively, are attached to the front spar.

4. The aircraft aerodynamic surface according to claim 2 wherein the second rib of the outboard control surface is attached to the front spar of the outboard control surface in the position where a first actuator fitting is attached to the front spar and the third rib of the outboard control surface is attached to the front spar of the outboard control surface in a position where a second actuator fitting is attached to the front spar.

5. The aircraft aerodynamic surface according to claim 1 wherein the two lateral ribs of the inboard control surface are arranged to define the inboard lateral rib an angle α1 with the spar between 65° to 85°, and he outboard lateral rib an angle α8 with the spar between 55° to 75°, and the two lateral ribs of the outboard control surface are arranged to define each lateral rib an angle (β1, β5) with the spar between 55° to 75°.

6. The aircraft aerodynamic surface according to claim 1 wherein the two inner ribs of the inboard control surface located between the inboard lateral rib and the central rib are arranged to define an angle (α2, α3) with the spar in the range between 95° to 115°.

7. The aircraft aerodynamic surface according to claim 1 wherein the third inner rib, fourth inner rib and fifth inner rib located between the central rib and the second lateral rib of the inboard control surface are arranged to define an angle (α5, α6, α7) with the spar in the range between 70° to 90°, 40° to 60° and 50° to 70° respectively.

8. The aircraft aerodynamic surface according to claim 1 wherein the second inner rib, third inner rib and fourth rib of the inboard control surface are attached to both the front spar and to the trailing edge and the first inner rib and fifth inner rib only to the front spar.

9. The aircraft aerodynamic surface according to claim 1 wherein the second inner rib located between the first lateral rib and the central rib of the outboard control surface is arranged to define an angle β2 with the spar in the range between 115° to 135°.

10. The aircraft aerodynamic surface according to claim 1 wherein the third rib located between the second lateral rib and the central rib and inclined towards the outboard lateral rib of the outboard control surface is arranged to define an angle β4 with the spar in the range between 50° to 70°.

11. The aircraft aerodynamic surface according to claim 1 wherein the inboard control surface the aspect ratio is in the range between 1.5 to 2.5 and the aspect ratio of the outboard control surface is between the range of 4.5 to 5.5.

12. An aircraft aerodynamic surface comprising:
a torsion box including a front spar and a rear spar;
a first control surface comprising a front spar and a trailing edge;
a second control surface comprising a front spar and a trailing edge, and
hinge fittings configured to pivotally attach the first control surface and the second control surface to the rear spar of the torsion box,
wherein the first control surface is an inboard control surface which comprises:
a first lateral rib and a second lateral rib each attached to at least one of the trailing edge and to the front spar arranged,
between the first and second lateral ribs are:
a central rib extending from the trailing edge to the front spar and defining an angle α4 with the front spar in a range of 75° to 95°,
first and second inner ribs between the first lateral rib and the central rib and inclined towards the first lateral rib, and
third, fourth and fifth inner ribs between the second lateral rib and the central rib and inclined towards the second lateral rib, and
an inner spar parallel to the front spar, attached to the central rib and extending from the second inner rib to the third inner rib, and
wherein the second control surface is an outboard control surface which comprises:
a first outboard lateral rib and a second outboard lateral rib each, attached to at least one of the trailing edge and the front spar of the outboard control surface and arranged to define each lateral rib an angle, β1, β5, respectively;
between the first and second outboard later ribs are:
a central inner rib extending from the trailing edge to the front spar arranged to define an angle β3 with the spar in the range between 80° to 100°;
a second inner rib between the first lateral rib and the central rib and inclined towards the first lateral rib,
a third inner rib between the second lateral rib and the central rib and inclined towards the second lateral rib,
internal spars parallel to the front spar and the trailing edge extended from the first lateral rib to the second lateral rib, and
at least one internal spar is parallel to the front spar and the trailing edge extended from the second rib to the third rib.

* * * * *